(12) United States Patent
Barsness et al.

(10) Patent No.: US 10,970,280 B2
(45) Date of Patent: *Apr. 6, 2021

(54) QUERY PLAN BASED ON A DATA STORAGE RELATIONSHIP

(71) Applicant: International Business Machines Corporation, Armonk, NY (US)

(72) Inventors: Eric L. Barsness, Pine Island, MN (US); Brian R. Muras, Otsego, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 725 days.

This patent is subject to a terminal disclaimer.

(21) Appl. No.: 14/877,902

(22) Filed: Oct. 7, 2015

(65) Prior Publication Data

US 2017/0103104 A1    Apr. 13, 2017

(51) Int. Cl.
*G06F 16/2453* (2019.01)
*G06F 16/2458* (2019.01)
*G06F 16/9535* (2019.01)

(52) U.S. Cl.
CPC .... *G06F 16/24542* (2019.01); *G06F 16/2471* (2019.01); *G06F 16/9535* (2019.01)

(58) Field of Classification Search
CPC ............................................... G06F 17/30463
See application file for complete search history.

(56) References Cited

U.S. PATENT DOCUMENTS

| | | | |
|---|---|---|---|
| 7,693,917 B2 | 4/2010 | Chariot et al. | |
| 7,941,425 B2 | 5/2011 | Sahu | |
| 8,108,382 B1 * | 1/2012 | Brown | G06F 16/24542 707/715 |
| 8,151,269 B1 * | 4/2012 | Brown | G06F 17/30306 707/713 |
| 9,389,909 B1 | 7/2016 | Langseth | |
| 2004/0210563 A1 | 10/2004 | Zait | |
| 2007/0250475 A1 * | 10/2007 | Idei | G06F 1/3203 |
| 2008/0256025 A1 * | 10/2008 | Bestgen | G06F 17/30424 707/2 |
| 2009/0125540 A1 | 5/2009 | Dettinger | |

(Continued)

OTHER PUBLICATIONS

Barsness et al., "Query Plan Based on a Data Storage Relationship", U.S. Appl. No. 15/075,178, filed Mar. 20, 2016.

(Continued)

*Primary Examiner* — Dawaune A Conyers
(74) *Attorney, Agent, or Firm* — Aaron N. Pontikos

(57) ABSTRACT

Disclosed aspects include the database management system detecting that a first data storage medium includes a first set of data of a database. The first data storage medium has a first access-factor. The database management system detects that a second data storage medium includes a second set of data of the database. The second data storage medium has a second access-factor which differs from the first access-factor. Based on a data storage relationship, the database management system determines a query plan to access both the first set of data with respect to the first data storage medium and the second set of data with respect to the second data storage medium. The database management system establishes the query plan.

14 Claims, 7 Drawing Sheets

(56) References Cited

U.S. PATENT DOCUMENTS

| | | | |
|---|---|---|---|
| 2009/0276445 A1 | 11/2009 | Flake | |
| 2009/0281986 A1* | 11/2009 | Bestgen | G06F 16/24542 |
| 2011/0016157 A1 | 1/2011 | Bear et al. | |
| 2011/0161310 A1 | 6/2011 | Tang | |
| 2012/0072413 A1 | 3/2012 | Castellanos | |
| 2012/0109936 A1 | 5/2012 | Zhang et al. | |
| 2012/0130986 A1* | 5/2012 | Abdellatif | G06F 17/30463 707/718 |
| 2012/0185518 A1 | 7/2012 | Giampaolo | |
| 2012/0330924 A1 | 12/2012 | Rajan | |
| 2014/0188808 A1 | 7/2014 | Wolf | |
| 2014/0188947 A1* | 7/2014 | Morris | G06F 17/30557 707/812 |
| 2014/0214793 A1 | 7/2014 | Tatemura | |
| 2016/0140166 A1 | 5/2016 | Schechter | |
| 2017/0103105 A1* | 4/2017 | Barsness | G06F 16/24542 |

OTHER PUBLICATIONS

List of IBM Patents or Patent Applications Treated as Related.

Graefe, Goetz, Rule-Based Query Optimization in Extensible Database Systems, IP.com No. 000161128, Dec. 31, 1987.

Anonymous, A system and method for efficiently using parameter markers on skewed data, IP.com No. 000238320, Aug. 18, 2014.

StackExchange, Are database query optimizers aware of storage performance differences?, <http://dba.stackexchange.com/questions/40864/are-database-query-optimizers-aware-of-storage-performance-differences>.

Pelley, Steven, et al., Do Query Optimizers Need to be SSDaware?, The Second International Workshop on Accelerating Data Management Systems using Modern Processor and Storage Architectures (ADMS'11), <www.adms-conf.org/p44-PELLEY.pdf>.

* cited by examiner

QUERY PLAN BASED ON A DATA STORAGE RELATIONSHIP

BACKGROUND

This disclosure relates generally to database management systems and, more particularly, relates to query plans. Databases are used to store information for numerous types of applications. Examples include various industrial, commercial, technical, scientific, and educational applications. Database management systems (DBMSs) are a typical mechanism for accessing data stored in a database. DBMSs are typically configured to separate the process of storing data from accessing, manipulating, or using data stored in a database. DBMSs often require tremendous resources to handle the heavy workloads placed on such systems. As such, it may be useful to increase the performance of database management systems with respect to processing searches, or queries, to databases.

SUMMARY

Aspects of the disclosure relate to a query optimizer accounting for varying storage media on which a database resides. Accordingly, the query optimizer can choose access plans that are efficient for the data being accessed by the query based on the storage media having the actual data. A database management system may detect that a database (e.g., having a database table) may be spread across various storage mediums that have different access speeds. Storage mediums can include hard disk drives (HDDs) of various speeds, solid state drives (SSDs), flash systems, etc. Disclosed aspects can track the percentage of data in a table that is on different drive technologies and use that in determining an efficient query plan. To illustrate, an input-output intensive plan may be selected if a majority of the data is stored on fast SSDs, or a less input-output intensive plan can be chosen if a majority of the data is stored on HDDs (which may be slower than the fast SSDs).

Aspects of the disclosure include a database management system detecting that a first data storage medium includes a first set of data of a database. The first data storage medium has a first access-factor. The database management system detects that a second data storage medium includes a second set of data of the database. The second data storage medium has a second access-factor which differs from the first access-factor. Based on a data storage relationship, the database management system determines a query plan to access both the first set of data with respect to the first data storage medium and the second set of data with respect to the second data storage medium. The database management system establishes the query plan. Aspects of the disclosure may provide performance or efficiency benefits for managing a database management system (e.g., speed, flexibility, responsiveness, resource usage, and productivity). Aspects may save resources such as bandwidth, processing, or memory.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
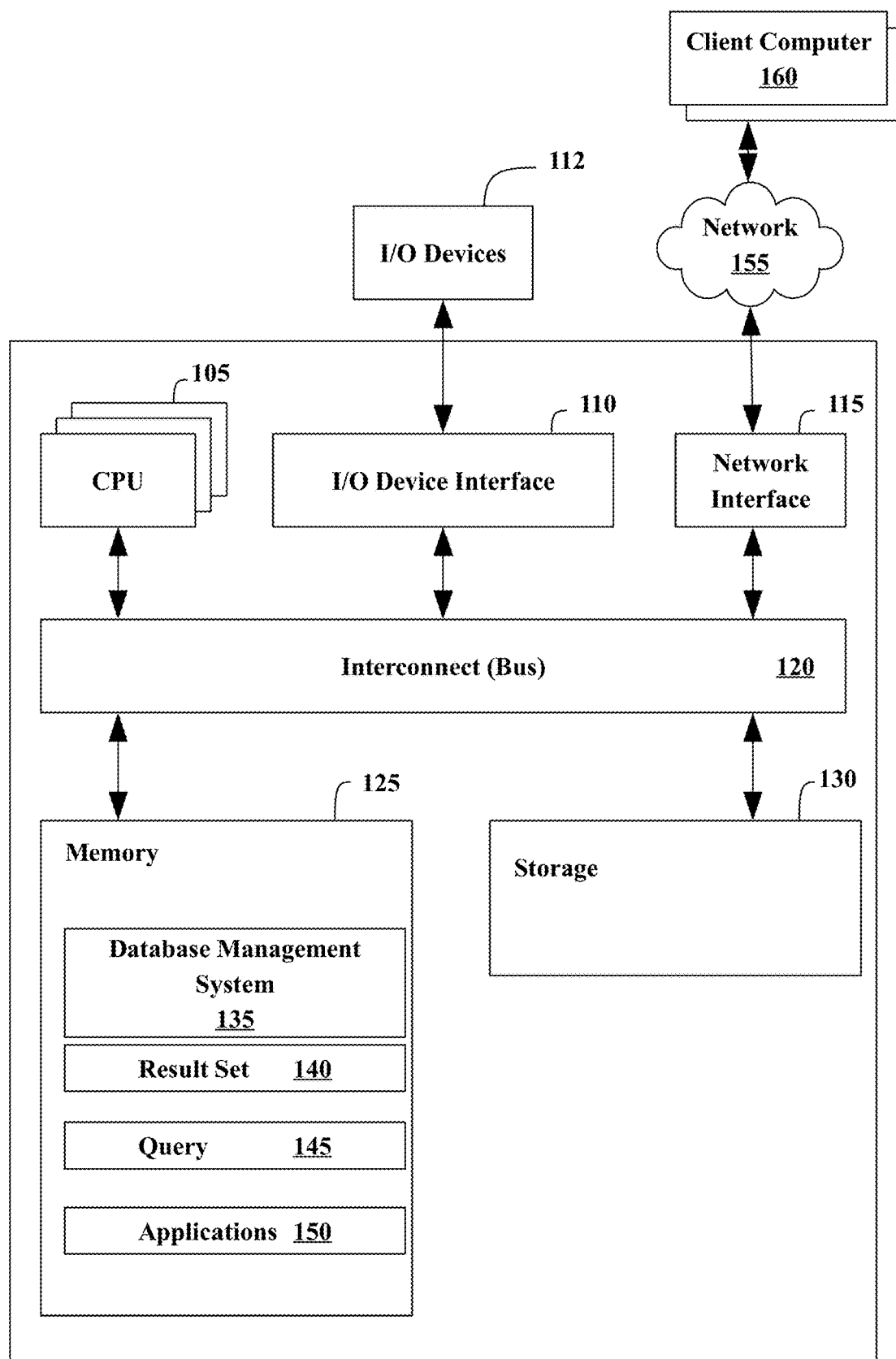
FIG. 1 illustrates an example representation of a computer system connected to a client computer via a network according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to a query optimizer accounting for varying storage media on which a database resides. Accordingly, the query optimizer can choose access plans that are efficient for the data being accessed by the query based on the storage media having the actual data. A database management system may detect that a database (e.g., having a database table) may be spread across various storage mediums that have different access speeds. Storage mediums can include hard disk drives (HDDs) of various speeds, solid state drives (SSDs), flash systems, etc. Disclosed aspects can track the percentage of data in a table that is on different drive technologies and use that in determining an efficient query plan. To illustrate, an input-output intensive plan may be selected if a majority of the data is stored on fast SSDs, or a less input-output intensive plan can be chosen if a majority of the data is stored on HDDs (which may be slower than the fast SSDs). As such, aspects of the disclosure include an ability to have more than one access type per database (e.g., database table) or per hardware type (e.g., storage medium type).

With hybrid storage systems, database tables can reside across multiple storage mediums of various access speeds. A table can exist partially on different storage types including SSDs and HDDs (either of which may be local or remote across a network such as on a storage area network (SAN)). Query optimizers may take input-output performance into account when making optimization plans. However, it may be desirable to calculate more than an average predicted speed for the storage system as a whole. A query optimizer that can detect use of a hybrid storage system and choose an appropriate query plan based on the location of the data may provide performance or efficiency benefits. Additionally, because a database may dynamically move data between storage mediums (e.g., based on frequency of access), the query optimizer can detect (or monitor) such activity so as to choose an efficient query plan.

To illustrate, statistics may decipher the layout of the data for various estimates. For example, a Frequent Value List (FVL) may keep common values of a given column(s), and an associated count of the number of rows with the value. As described herein, values in the FVL may keep a sub count of how many values come from each storage location (e.g., SSD, HDD, SAN) or an associated access time to retrieve rows from such storage-type. Accordingly, when an estimate is required from the FVL, the FVL can give the estimated number of rows selected and also return an estimated input-output time considering that the storage of the rows are spread across one or more storage media.

For example, a database with a "State" column having "Minnesota" rows and "Wisconsin" rows can have 20 rows for each state in a table. If the 20 Minnesota rows are stored with 11 on an SSD, 8 on an HDD, and 1 on a SAN while the 20 Wisconsin rows are stored with 0 on an SSD, 9 on an HDD, and 11 on an SAN, the access count of the Minnesota rows will be faster (with all other factors being equal) based on the distribution (e.g., SSD may be retrieved significantly faster than SAN). Similarly, with an index estimate, the index may determine (e.g., based on the layout of the index tree) which rows point to SSD, HDD, local disk, remote disk, etc. by analyzing the leaf nodes (or pointers therein). The index can return such information similar to how the FVL does as described above.

In embodiments, a query optimizer can utilize information as described herein to determine/establish an efficient query plan. In certain embodiments, the query plan may be different for the same query with different parameter marker values including when the same number of rows are selected. To continue using the previous example, "select * from myTable where state=?" As such, a different query plan may be developed for each state (e.g., a first query plan for Minnesota data, a second query plan for Wisconsin data). Also, a query plan may have different implementation methods for each storage device portion of a particular table. For instance, perhaps the query plan scans the portion of the table that is on an SSD since the SSD may be fast, but uses an index for the portion that is on an HDD or an SAN since the HDD/SAN may be slower. A variety of embodiments including but not limited to combinations using aspects as described herein are contemplated.

Aspects of the disclosure include a method, system, and computer program product for managing a database management system. The database management system detects that a first data storage medium includes a first set of data of a database. The first data storage medium has a first access-factor. The database management system detects that a second data storage medium includes a second set of data of the database. The second data storage medium has a second access-factor which differs from the first access-factor.

Based on a data storage relationship, the database management system determines a query plan to access both the first set of data with respect to the first data storage medium and the second set of data with respect to the second data storage medium. In response to determining the query plan, the database management system establishes the query plan. Aspects of the disclosure may provide performance or efficiency benefits for managing a database management system (e.g., speed, flexibility, responsiveness, resource usage, and productivity). Aspects may save resources such as bandwidth, processing, or memory.

FIG. 1 illustrates an example representation of a computer system 100 connected to one or more client computers 160 via a network 155, according to some embodiments. For the purposes of this disclosure, computer system 100 may represent practically any type of computer, computer system, or other programmable electronic device, including but not limited to, a client computer, a server computer, a portable computer, a handheld computer, an embedded controller, etc. In some embodiments, computer system 100 may be implemented using one or more networked computers, e.g., in a cluster or other distributed computing system.

The computer system 100 may include, without limitation, one or more processors (CPUs) 105, a network interface 115, an interconnect 120, a memory 125, and a storage 130. The computer system 100 may also include an I/O device interface 110 used to connect I/O devices 112, e.g., keyboard, display, and mouse devices, to the computer system 100.

Each processor 105 may retrieve and execute programming instructions stored in the memory 125 or storage 130. Similarly, the processor 105 may store and retrieve application data residing in the memory 125. The interconnect 120 may transmit programming instructions and application data between each processor 105, I/O device interface 110, network interface 115, memory 125, and storage 130. The interconnect 120 may be one or more busses. The processor 105 may be a single central processing unit (CPU), multiple CPUs, or a single CPU having multiple processing cores in various embodiments. In one embodiment, a processor 105 may be a digital signal processor (DSP).

The memory 125 may be representative of a random access memory, e.g., Static Random Access Memory (SRAM), Dynamic Random Access Memory (DRAM), read-only memory, or flash memory. The storage 130 may be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 115 may be configured to transmit data via the communications network 155.

The memory 125 may include a database management system (DBMS) 135, a result set 140, a query 145, and applications 150. Although these elements are illustrated as residing in the memory 125, any of the elements, or combinations thereof, may reside in the storage 130 or partially in the memory 125 and partially in the storage 130. Each of these elements will be described in greater detail in accordance with FIG. 2.

The network 155 may be any suitable network or combination of networks and may support any appropriate protocol suitable for communication of data and/or code to/from the server computer system 100 and the client computer system 160. In some embodiments, the network 155 may support wireless communications. In other embodiments, the network 155 may support hardwired communications. The network 155 may be the Internet and may support Internet Protocol in some embodiments. In other embodiments, the network 155 may be implemented as a local area network (LAN) or a wide area network (WAN). The network 155 may also be implemented as a cellular data network. Although the network 155 is shown as a single network in the figures, one or more networks of the same or different types may be included.

The client computer system 160 may include some or all of the hardware and software elements of the computer system 100 previously described. As shown, there may be one or more client computers 160 connected to the computer system 100 via the network 155. In some embodiments, one or more client computers 160 may send a query 145 by network 155 to computer system 100 and receive a result set 140.

Figure 2:
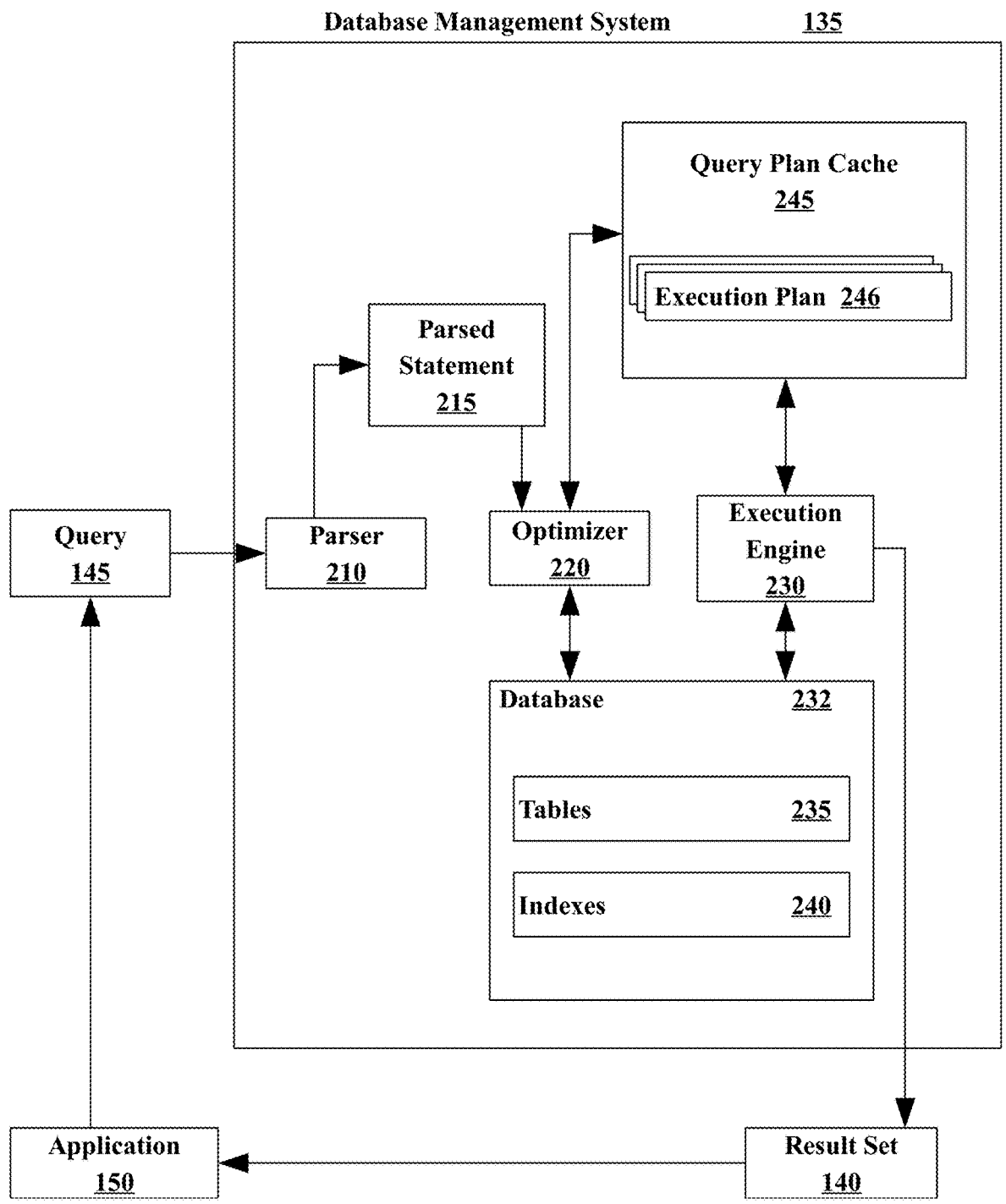
FIG. 2 illustrates an example database management system (DBMS) according to an embodiment.

FIG. 2 illustrates an example database management system (DBMS) 135. The DBMS 135 may include a parser 210, an optimizer 220, an execution engine 230, and a database 232. The parser 210 may receive a database query 145 from an application 150. In some embodiments, the database query 145 may be in the form of a Structured Query Language (SQL) statement. The parser 210 may generate a parsed statement 215. The parser 210 may send the parsed statement 215 to an optimizer 220. The optimizer 220 may attempt to optimize the parsed statement. In some embodiments, optimizing may improve the performance of the database query 145 by, for example, reducing the amount of time it takes to provide a user with a response. The optimizer 220 may generate an execution plan 246 (access plan), which may be maintained in a query plan cache 245, according to some embodiments. The query plan cache 245 may include one or more execution plans 246, including the current execution plan as well as previously used execution plans. Once an execution plan 246 is generated, the execution plan 246 may be sent to the execution engine 230. The execution engine 230 may execute the query 145. Executing the query 145 may include finding and retrieving data in the database tables 235 that satisfies the criteria supplied in the query 145. The execution engine 230 may store the data returned matching the query 145 in a result set 140. The DBMS 135 may return the result set 140 to an application 150, such as the application in which the database query 145 was generated, as a response to the database query 145.

A database 232 may include one or more tables 235 and, in some embodiments, one or more indexes 240. A database table 235 may organize data into rows and columns. Each row of a database table 235 may correspond to an individual entry, a tuple, or a record in the database 232. A column may define what is stored in each entry, tuple, or record. In some embodiments, columns of a table 235 may also be referred to as fields or attributes. Each table 235 within the database 232 may have a unique name. Each column within a table 235 may also have a unique name. A row, tuple, or record, however, within a particular table 235 may not be unique, according to some embodiments. A database 232 may also include one or more indexes 240. An index 240 may be a data structure that may inform the DBMS 135 of the location of a particular record within a table 235 if given a particular indexed column value. In some embodiments, the execution engine 230 may use the one or more indexes 240 to locate data within a table 235. In other embodiments, the execution engine 230 may scan the tables 235 without using an index 240.

As mentioned herein, the optimizer 220 creates the query access plan. The optimizer 220 may be implemented as computer program instructions that optimize the access plan in dependence upon database management statistics. Database statistics may reveal, for example, that there are only two identification values in a transactions table—so that it is an optimization, that is, more efficient, to scan the transactions table rather than using an index. Alternatively, database statistics may reveal that there are many transaction records with only a few transaction records for each identification value—so that it is an optimization, that is, more efficient, to access the transaction records by an index.

Figure 3:
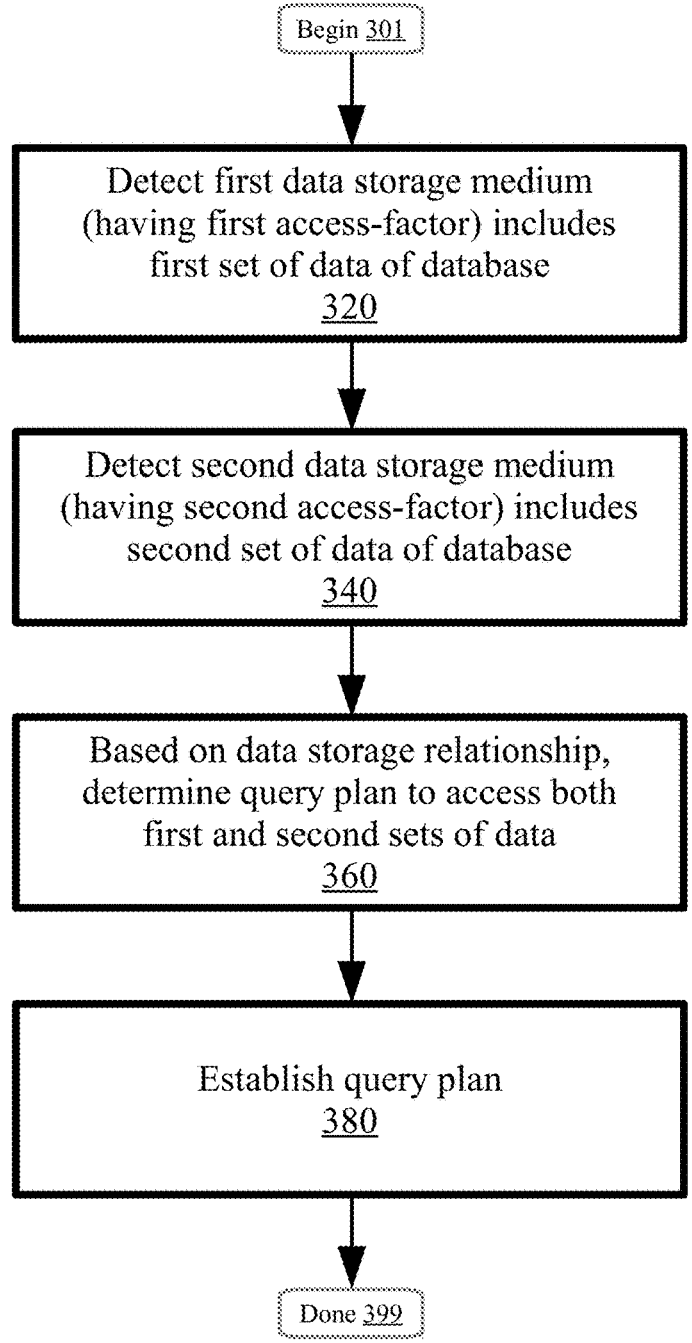
FIG. 3 is a flowchart illustrating a method for managing a database management system according to embodiments.

FIG. 3 is a flowchart illustrating a method 300 for managing a database management system according to embodiments. For example, the database management system may include information for a car manufacturer related to a plurality of car dealerships and their associated transactions. The car manufacturer may have car dealerships of varying sizes in different states. As such, the information that the car manufacturer desires to query may be spread across various storage mediums in multiple locations with multiple types of physical storage hardware. Method 300 may begin at block 301.

At block 320, the database management system detects that a first data storage medium includes a first set of data of a database. The first data storage medium has a first access-factor. For example, a centralized database may typically be updated weekly on Sunday night for the car manufacturer. However, the car manufacturer may desire up-to-date information when running a query at the end of a quarter on Thursday in anticipation of an important Friday board meeting. As such, a first dealership located in Minnesota may have the first set of data (e.g., related to sales transactions) stored on a solid state drive. Accordingly, the solid state drive may have a first access-factor score of 90 (e.g., on a scale of 0 to 100 where 0 is slow/unreliable and 100 is fast/reliable).

At block 340, the database management system detects that a second data storage medium includes a second set of data of the database. The second data storage medium has a second access-factor which differs from the first access-factor. To illustrate according to the example, a second dealership located in North Dakota may have the second set of data (e.g., related to sales transactions) stored on a hard disk drive. Accordingly, the hard disk drive may have a second access-factor score of 60 (e.g., on a scale of 0 to 100 where 0 is slow/unreliable and 100 is fast/reliable). In certain embodiments, the quantity of data may be different (e.g., the first dealership may have twice as many transactions as the second dealership).

At block 360, based on a data storage relationship, the database management system determines a query plan to access both the first set of data with respect to the first data storage medium and the second set of data with respect to the second data storage medium. The data storage relationship may correlate to a quality/quantity of data stored on a plurality of data storage media. For instance, the data storage relationship may weigh the access-factor scores relative to the quantity of data to determine how to efficiently retrieve the information for the car manufacturer. In the example, a more input-output intensive query plan may be chosen because the first dealership has twice as many transactions as the second dealership, and the first dealership uses a solid state drive having an access factor score of 90 (while the second dealership uses a hard disk drive having an access factor score of 60). In choosing query plans in embodiments, parallel access to disparate storage media may be constrained by the least efficient (e.g., slowest) storage medium being accessed. To illustrate, various average speeds (e.g., number of rows as they relate to access speed) may be calculated for various storage mediums. Each particular storage medium may be evaluated so as to derive one storage medium which needs to be accessed but is the least efficient of such necessary accessed storage media. Such computations may be useful in cloud environments using a variety of different physical hardware configurations to store data across a plurality of servers.

At block 380, the database management system establishes the query plan. Establishing can include creating, generating, structuring, constructing, forming, ascertaining, identifying, resolving, compiling, or computing. To illustrate, because structured query language (SQL) is declarative, there can typically be multiple different ways to execute a given query (e.g., query plans) and each of those ways yields a different performance (e.g., while arriving at the same results). A query plan can include an ordered sequence of steps used to access or modify information in SQL based data systems. A typical query optimizer considers candidate query plans for a given query and determines which of those query plans will be efficient (e.g., lesser amount of latency). In the example, the input-output intensive query plan may be established.

Method 300 concludes at block 399. Aspects of method 300 may provide performance or efficiency benefits with respect to managing a database management system. For example, aspects of method 300 may include positive impacts on resource usage (e.g., memory) or speed (e.g., processing) by selecting a query plan appropriate for the data and storage mediums involved. In embodiments, performance or efficiency benefits when processing a query using a database management system may occur (e.g., speed, flexibility, load balancing, responsiveness, and productivity).

Figure 4:
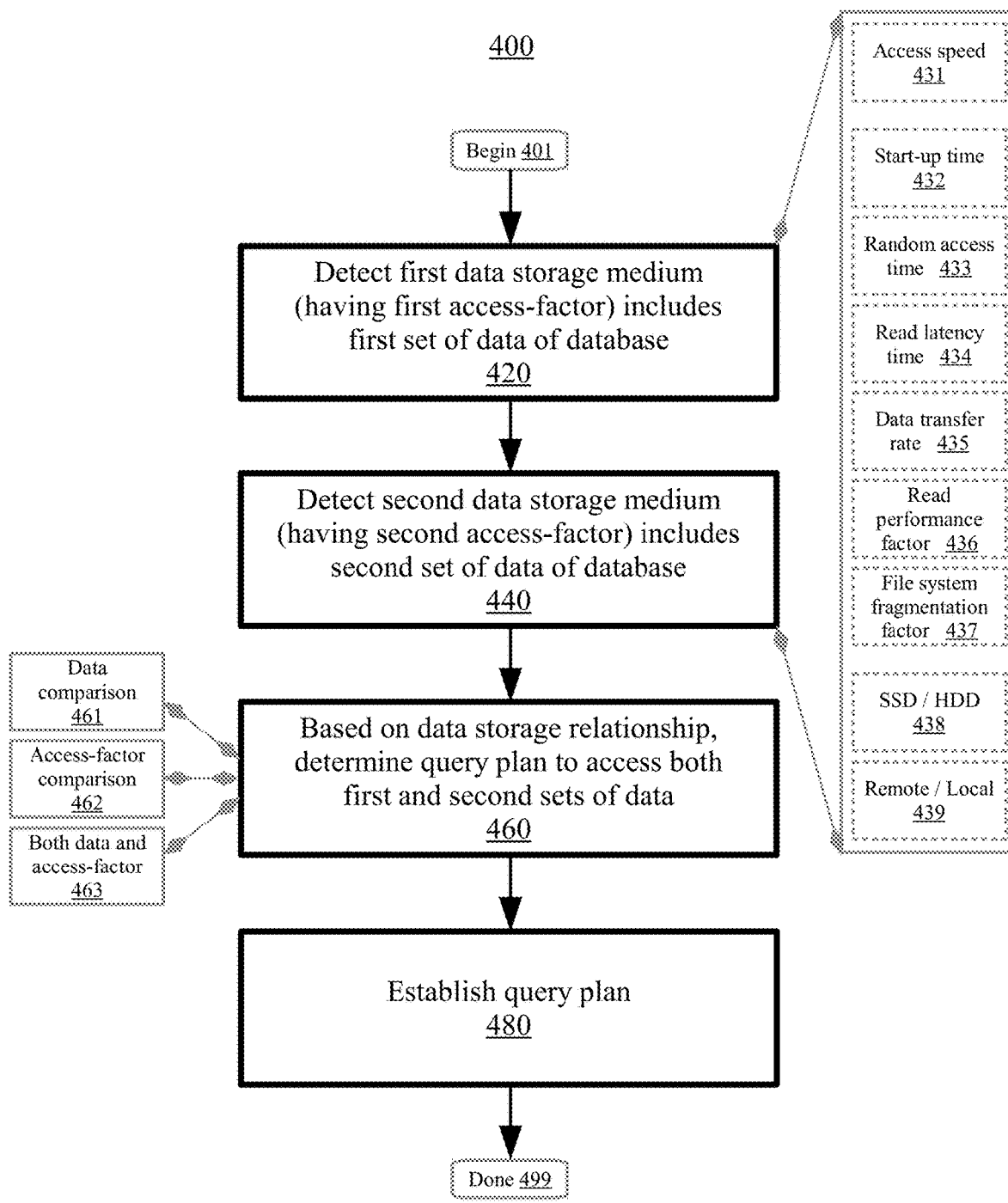
FIG. 4 is a flowchart illustrating a method for managing a database management system according to embodiments.

FIG. 4 is a flowchart illustrating a method 400 for managing a database management system according to embodiments. Method 400 may begin at block 401. At block 420, the database management system detects that a first data storage medium includes a first set of data of a database. The first data storage medium has a first access-factor. At block 440, the database management system detects that a second data storage medium includes a second set of data of the database. The second data storage medium has a second access-factor which differs from the first access-factor.

In embodiments, the first access-factor includes a first access speed (e.g., a temporal period to retrieve a given amount of information, 100 rows per second), and the second access-factor includes a second access speed (e.g., 80 rows per second) at block 431. In various embodiments, the first and second access-factors include a selection from a group consisting of at least one of: a start-up time (e.g., temporal period to ready a storage device for activity) at block 432, a random access time (e.g., temporal period to locate a single piece of information and make it available to the computer for processing) at block 433, a read latency time (e.g., temporal period it takes to position the proper sector under the read/write head) at block 434, a data transfer rate (e.g., speed of travel of a given amount of data from one place to another) at block 435, a read performance factor (e.g., temporal period it takes to read a given amount of data) at block 436, or a file system fragmentation factor (e.g., ability/inability of a file system to lay out related data sequentially/contiguously) at block 437. In embodiments, the first data storage medium includes a solid-state drive and the second data storage medium includes a hard disk drive at block 438. In embodiments, the first data storage medium includes a remote drive (e.g., cloud server, off-site compute node) and the second data storage medium includes a local drive (e.g., compute node local to the query optimizer, local relative to the remote drive) at block 439.

At block 460, based on a data storage relationship, the database management system determines a query plan to access both the first set of data with respect to the first data storage medium and the second set of data with respect to the second data storage medium. In embodiments, the data storage relationship includes a comparison with respect to the first set of data and the second set of data (e.g., quantity of data in size such as number of rows or space occupied, quality/nature of data such as indicated as important or unimportant) at block 461. In embodiments, the data storage relationship includes a comparison with respect to the first access-factor and the second access-factor (e.g., 100 rows per second versus 80 rows per second, 20 megabytes per second versus 10 megabytes per second) at block 462. The data storage relationship may relate to the first set of data, the second set of data, the first access-factor, and the second access-factor (e.g., both access speeds of the media and quantity/quality of data stored on the media) at block 463.

At block 480, the database management system establishes/generates the query plan. Method 400 concludes at block 499. Aspects of method 400 may provide performance or efficiency benefits with respect to managing a database management system. For example, aspects of method 400 may include positive impacts on resource usage (e.g., memory) or speed (e.g., processing) by selecting a query plan appropriate for the data and storage mediums involved. In embodiments, performance or efficiency benefits when processing a query using a database management system may occur (e.g., speed, flexibility, load balancing, responsiveness, and productivity).

Figure 5:
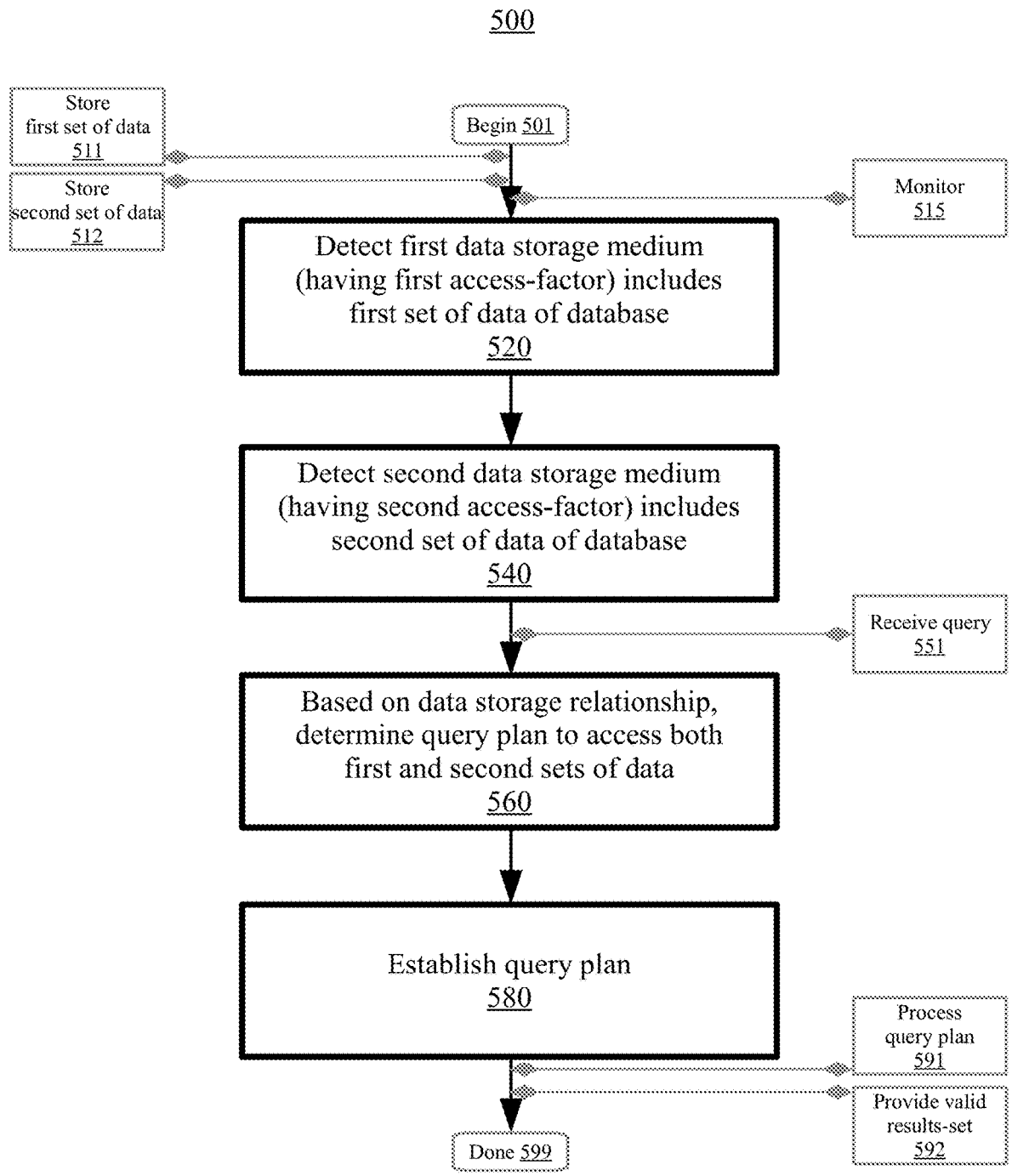
FIG. 5 is a flowchart illustrating a method for managing a database management system according to embodiments.

FIG. 5 is a flowchart illustrating a method 500 for managing a database management system according to embodiments. Method 500 may begin at block 501. In embodiments, the database management system stores (e.g., writes) the first set of data to the first data storage medium at block 511. Similarly, the database management system may store (e.g., save) the second set of data to the second data storage medium at block 512. Using database statistics, the first and second sets of data may be monitored with respect to the first and second data storage mediums at block 515. For example, the percentage of data in a database that is on different storage medium technologies (e.g., drive technologies) may be tracked. The monitoring may occur in response to the storing (e.g., by updating database statistics subsequent to storing the sets of data).

At block 520, the database management system detects that the first data storage medium includes the first set of data of a database (e.g., in response to storing the first and second sets of data). The first data storage medium has a first access-factor. At block 540, the database management system detects that the second data storage medium includes the second set of data of the database. The second data storage medium has a second access-factor which differs from the first access-factor. In embodiments, the database management system receives (e.g., from a user, from another compute node) a query which is associated with (e.g., uses data from) both the first and second sets of data at block 551. For example, the car manufacturer may request an aggregation of all data from its plurality of car dealerships related to new vehicles in stock on the lot.

At block 560, based on a data storage relationship, the database management system determines a query plan to access both the first set of data with respect to the first data storage medium and the second set of data with respect to the second data storage medium. At block 580, the database management system establishes/generates the query plan. The database management system may process (e.g., execute) the query plan at block 591. In embodiments, the database management system uses the query plan to provide a valid results-set for the query. Providing the valid results-set for the query can include routing the valid results-set to the originator of the query, processing an output with respect to the valid results-set, returning the valid results-set to a list, or displaying at least a portion of a valid results-set (e.g., to a user). Method 500 may have various performance or efficiency benefits (such as those described herein) and concludes at block 599.

Figure 6:
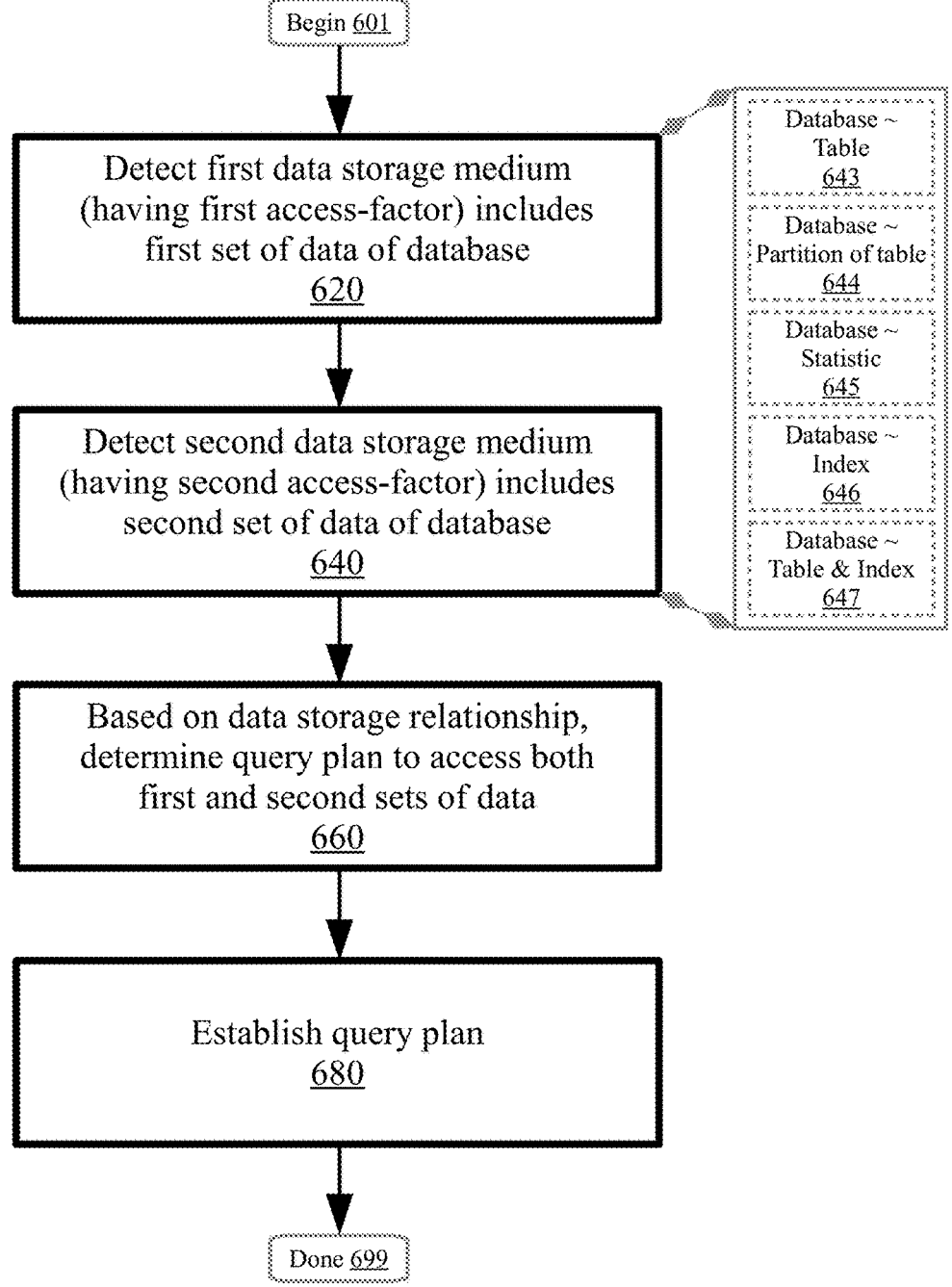
FIG. 6 is a flowchart illustrating a method for managing a database management system according to embodiments.

FIG. 6 is a flowchart illustrating a method 600 for managing a database management system according to embodiments. Method 600 may begin at block 601. At block 620, the database management system detects that a first data storage medium includes a first set of data of a database. The first data storage medium has a first access-factor. At block 640, the database management system detects that a second data storage medium includes a second set of data of the database. The second data storage medium has a second access-factor which differs from the first access-factor.

In embodiments, the database includes a table which has both the first and second sets of data at block 643. The database can include a partition of table which has both the first and second sets of data at block 644. In certain embodiments, the database includes a statistic which has both the first and second sets of data (e.g., a frequent value list which stores common values of a given column and an associated count of the number of rows with a particular value including a related sub count of the number of particular values from each storage media) at block 645. In various embodiments, the statistic may include a histogram, a cardinality, or be based on a number of duplicates (e.g., an average number of duplicates). The database may include an index which has both the first and second sets of data (e.g., with indicated rows pointing toward indicated storage media using leaf nodes or pointers) at block 646. In various embodiments, the database includes a table which has the first set of data and an index which has the second set of data at block 647.

At block 660, based on a data storage relationship, the database management system determines a query plan to access both the first set of data with respect to the first data storage medium and the second set of data with respect to the second data storage medium. At block 680, the database management system establishes/generates the query plan. Method 600 may have various performance or efficiency benefits (such as those described herein) and concludes at block 699.

Figure 7:
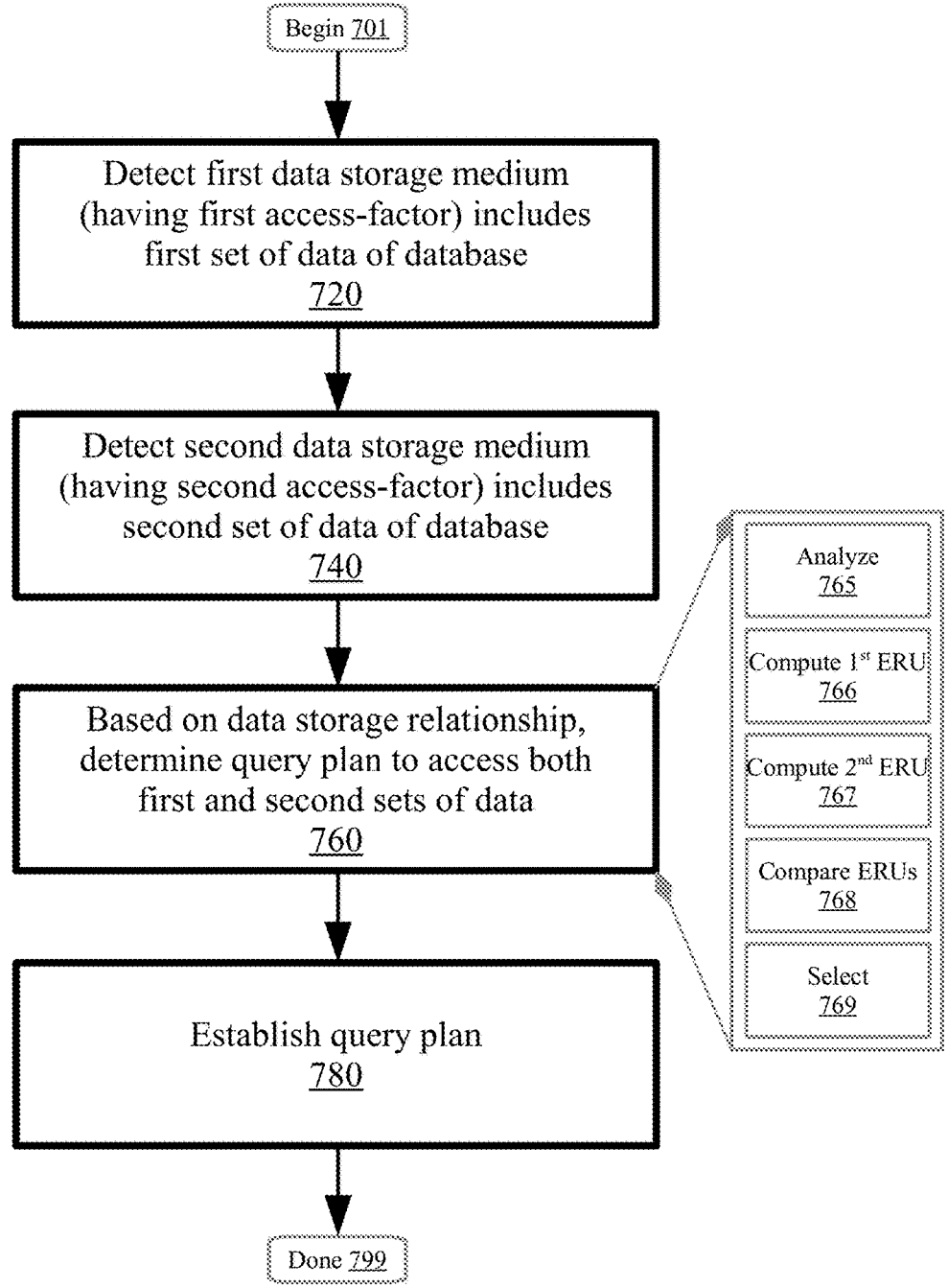
FIG. 7 is a flowchart illustrating a method for managing a database management system according to embodiments.

FIG. 7 is a flowchart illustrating a method 700 for managing a database management system according to embodiments. Method 700 may begin at block 701. At block 720, the database management system detects that a first data storage medium includes a first set of data of a database. The first data storage medium has a first access-factor (e.g., first access-speed). At block 740, the database management system detects that a second data storage medium includes a second set of data of the database. The second data storage medium has a second access-factor (e.g., second access-speed) which differs from the first access-factor. At block 760, based on a data storage relationship, the database management system determines a query plan to access both the first set of data with respect to the first data storage medium and the second set of data with respect to the second data storage medium.

In embodiments, the database management system determining the query plan based on the data storage relationship includes a set of operations. The data storage relationship can be analyzed at block 765. For instance, analyzing can include extracting (e.g., creating a derivation), examining (e.g., performing an inspection), scanning (e.g., reviewing a sample), evaluating (e.g., generating an appraisal), dissecting (e.g., scrutinizing an attribute), resolving (e.g., ascertaining an observation/conclusion/answer), parsing (e.g., deciphering a construct), searching (e.g., exploring for a reason/ground/motivation), comparing (e.g., relating an assessment), classifying (e.g., assigning a designation), or categorizing (e.g., organizing by a feature). Data analysis may include a process of inspecting, cleaning, transforming, or modeling data to discover useful information, suggest conclusions, or support decisions. Data analysis can extract information/patterns from a data set and transform/translate it into an understandable structure (e.g., a data report which can be provided/furnished) for further use. Accordingly, such analysis may identify a set of candidate query plans including both a first candidate query plan and a second candidate query plan.

In response to such analysis, a first expected resource usage (e.g., a processor usage value for execution) may be computed for the first candidate query plan at block 766. Also, a second expected resource usage may be computed for the second candidate query plan at block 767. The first and second expected resource usages may be compared at block 768. Based on the second expected resource usage exceeding the first expected resource usage, the first candidate query plan may be selected (e.g., select the candidate query plan using fewer resources such as processor, memory, bandwidth, and disk). In certain embodiments, usage may be measured in terms of cost-burden which may include selecting a query plan which uses greater resources (e.g., more disk space) but incurs a lesser cost on the user (e.g., not using a processor during peak hours). At block 780, the database management system establishes/generates the query plan.

In various embodiments, the first candidate query plan may include both a first query plan portion for the first set of data and a second query plan portion for the second set of data. In various embodiments, the second candidate query plan may include both a third query plan portion for the first set of data and a fourth query plan portion for the second set of data. In various embodiments, the comparison can include evaluating various combinations of the first, second, third, and fourth query plan portions. For example, the query plan established at block 780 may include the first query plan portion for the first set of data and the fourth query plan portion for the second set of data. As such, this may be considered a third candidate query plan. The third candidate query plan may be compared with the first/second query plan(s) based on expected resource usage as described herein (e.g., overall expected resource usage when compiling expected resource usage portions for the first and second sets of data). Method 700 may have various performance or efficiency benefits (such as those described herein) and concludes at block 799.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for managing a database management system, the method comprising:
   detecting, by the database management system, that a first data storage medium includes a first set of data of a database, wherein the first data storage medium has a first access-factor;
   detecting, by the database management system, that a second data storage medium includes a second set of data of the database, wherein the second data storage medium has a second access-factor which differs from the first access-factor;
   determining, by the database management system based on a data storage relationship, a query plan to access both the first set of data with respect to the first data storage medium and the second set of data with respect to the second data storage medium, wherein the data storage relationship includes a comparison between a start-up time, a random access time, a read latency time, a data transfer rate, a read performance factor, and a file system fragmentation factor for both the first data storage medium and the second data storage medium, and
   wherein determining the query plan to access the first set of data and the second set of data includes: (i) monitoring and detecting movements of data between storage mediums of the database management system based on location and size of the data, and (ii) based on the monitoring and detecting, and based on database management statistics including identification values in one or more transaction tables for the first set of data and the second set of data, determining to access the first set of data via a scan of a transaction table, and determining to access the second set of data via an index;
   establishing, by the database management system, the query plan, wherein the query plan includes a first step corresponding to a first parameter value and a second step corresponding to a second parameter value, and wherein the second parameter value is different from the first parameter value;
   receiving, by the database management system, a query associated with both the first and second sets of data;
   processing, by the database management system, the query plan; and
   providing, by the database management system using the query plan, a valid results-set for the query.

2. The computer-implemented method of claim 1, wherein the data storage relationship includes a comparison with respect to the first set of data and the second set of data.

3. The computer-implemented method of claim 1, wherein the data storage relationship relates to the first set of data, the second set of data, the first access-factor, and the second access-factor.

4. The computer-implemented method of claim 1, wherein the first access-factor includes a first access speed, and wherein the second access-factor includes a second access speed.

5. The computer-implemented method of claim 1, wherein the first data storage medium includes a solid-state drive, and wherein the second data storage medium includes a hard disk drive.

6. The computer-implemented method of claim 1, wherein the first data storage medium includes a local drive, and wherein the second data storage medium includes a remote drive.

7. The computer-implemented method of claim 1, further comprising:
   storing, by the database management system to the first data storage medium, the first set of data; and
   storing, by the database management system to the second data storage medium, the second set of data.

8. The computer-implemented method of claim 1, further comprising:

monitoring, using database statistics, the first and second sets of data with respect to the first and second data storage mediums.

9. The computer-implemented method of claim 1, wherein the database includes a table which has both the first and second expected resource usages; and selecting, based on the second expected resource usage exceeding the first expected resource usage, a first candidate query plan.

10. The computer-implemented method of claim 1, wherein the database includes a partition of a table which has both the first and second sets of data.

11. The computer-implemented method of claim 1, wherein the index includes both the first and second sets of data.

12. The computer-implemented method of claim 1, wherein the transaction table includes the first set of data, and wherein the index includes the second set of data.

13. The computer-implemented method of claim 1, wherein determining, by the database management system based on the data storage relationship, the query plan further includes:

analyzing the data storage relationship to identify a set of candidate query plans including both a first candidate query plan and a second candidate query plan;

computing a first expected resource usage for the first candidate query plan;

computing a second expected resource usage for the second candidate query plan;

comparing the first and second expected resource usages; and selecting, based on the second expected resource usage exceeding the first expected resource usage, the first candidate query plan.

14. The computer-implemented method of claim 1, wherein the first step and the second step correspond to a same number of rows.

* * * * *